US012249255B1

(12) United States Patent
Latenser, II et al.

(10) Patent No.: US 12,249,255 B1
(45) Date of Patent: Mar. 11, 2025

(54) DEPLOYABLE PORTABLE SIGN SYSTEM

(71) Applicants: Russell Edward Latenser, II, Edmond, OK (US); Thomas Scott Johnson, Oklahoma City, OK (US)

(72) Inventors: Russell Edward Latenser, II, Edmond, OK (US); Thomas Scott Johnson, Oklahoma City, OK (US)

(73) Assignee: Information Exchange Network, Inc., El Reno, OK (US)

( * ) Notice: Subject to any disclaimer, the term of this patent is extended or adjusted under 35 U.S.C. 154(b) by 0 days.

(21) Appl. No.: 18/466,427

(22) Filed: Sep. 13, 2023

(51) Int. Cl.
*G09F 21/04* (2006.01)
*G09F 7/20* (2006.01)
*G09F 7/18* (2006.01)

(52) U.S. Cl.
CPC ................ *G09F 21/04* (2013.01); *G09F 7/20* (2013.01); *G09F 2007/1865* (2013.01)

(58) Field of Classification Search
CPC .... G09F 21/04; G09F 7/20; G09F 2007/1865; G09F 15/0025; G09F 21/042; G09F 21/048; G09F 21/0485; G09F 21/049; B62D 63/062; B60S 9/02; B60D 1/66; E02F 9/085
USPC ................. 296/21; 40/590; 280/764.1–765.1
See application file for complete search history.

(56) References Cited

U.S. PATENT DOCUMENTS 2,613,463 A 10/1952 Transue
3,702,033 A * 11/1972 Coleman ................ G09F 21/04 280/415.1
3,792,678 A 2/1974 Rowland
3,804,355 A 4/1974 Uroshevich
4,438,580 A 3/1984 Yamaji et al.
4,458,379 A 7/1984 Shelton et al.
4,552,089 A 11/1985 Mahoney
4,592,158 A 6/1986 Seely
4,593,265 A 6/1986 McKenney
(Continued)

FOREIGN PATENT DOCUMENTS

CA 2585677 A1 10/2008
CN 111634165 A 9/2020
(Continued)

OTHER PUBLICATIONS

Google Patents; machine translation of CN111634165A (patent from China), retrieved on Sep. 13, 2023 from https://www.patents.google.com.
(Continued)

*Primary Examiner* — Cassandra Davis
(74) *Attorney, Agent, or Firm* — Robert H. Frantz

(57) ABSTRACT

A separable and deployable portable sign and transportation system are disclosed having at least a sign frame which is independent of and separate from a transportation frame, a sign panel on an upright member affixed to the sign frame, and one or more lift-stabilizers affixed to the sign frame, having at least a first mode of operation in a stowed position for transportation, and at least a second mode of operation in a deployed position holding the sign frame above a surface according to a minimum mating height and clearance to receive a corresponding transportation subsystem, wherein a footprint area defined by the lift-stabilizers in the second mode of operation is greater than a footprint area defined by the lift-stabilizers in the first mode of operation.

14 Claims, 8 Drawing Sheets

(56) References Cited

U.S. PATENT DOCUMENTS

| | | | | |
|---|---|---|---|---|
| 4,691,892 | A | 9/1987 | Grewe et al. | |
| 4,747,515 | A | 5/1988 | Kasher et al. | |
| 4,923,243 | A | 5/1990 | Drahos | |
| 5,082,221 | A | 1/1992 | Lai | |
| 5,082,222 | A | 1/1992 | Hsu | |
| 5,094,023 | A | 3/1992 | McVey | |
| 5,161,814 | A | 11/1992 | Walker | |
| 5,244,334 | A | 9/1993 | Akita et al. | |
| 5,340,068 | A | 8/1994 | Sarkisian et al. | |
| 5,488,792 | A | 2/1996 | Kwok | |
| 5,489,077 | A | 2/1996 | Stoudt | |
| 5,732,911 | A | 3/1998 | Kulp et al. | |
| 6,199,384 | B1 | 3/2001 | Udischas | |
| 6,247,528 | B1 * | 6/2001 | Blomgren | F28D 9/005 165/178 |
| 6,517,134 | B2 | 2/2003 | Armstrong | |
| 6,659,496 | B1 | 12/2003 | Wilson | |
| 6,668,474 | B2 | 12/2003 | Winterton et al. | |
| 6,734,792 | B1 | 5/2004 | McElveen | |
| 7,273,198 | B2 | 9/2007 | Tourtelloutte et al. | |
| 7,350,328 | B1 | 4/2008 | Garcia | |
| 7,503,135 | B2 | 3/2009 | Chafin | |
| 8,136,281 | B2 | 3/2012 | Macdougall | |
| 8,152,435 | B2 | 4/2012 | Nespor | |
| 8,164,483 | B1 | 4/2012 | Phillips | |
| 8,246,068 | B2 | 8/2012 | Macdougall | |
| 8,726,552 | B2 | 5/2014 | Larsen | |
| 9,845,610 | B2 * | 12/2017 | Scott, IV | E04B 1/343 |
| 9,868,380 | B2 | 1/2018 | Peterson et al. | |
| 10,417,908 | B2 * | 9/2019 | Nicholson | G09F 21/04 |
| 11,401,669 | B2 | 8/2022 | Kulp et al. | |
| 11,501,666 | B1 | 11/2022 | Marston | |
| 2004/0016158 | A1 * | 1/2004 | Kim | G09F 21/04 40/590 |
| 2008/0197252 | A1 | 8/2008 | Clewett | |
| 2009/0255887 | A1 | 10/2009 | Mrowiec | |
| 2009/0266857 | A1 | 10/2009 | Dennis | |
| 2009/0322060 | A1 | 12/2009 | Macdougall | |
| 2010/0058635 | A1 | 3/2010 | Knapp et al. | |
| 2010/0187794 | A1 | 7/2010 | Macdougall | |
| 2012/0002357 | A1 * | 1/2012 | Auld | G09F 11/30 361/679.01 |
| 2012/0017477 | A1 * | 1/2012 | Sipperley | G09F 13/02 105/328 |
| 2015/0246681 | A1 | 9/2015 | Raper, Jr. et al. | |
| 2015/0269874 | A1 | 9/2015 | Macdougall | |
| 2016/0031502 | A1 * | 2/2016 | Hall | B62D 63/062 280/415.1 |
| 2016/0161047 | A1 * | 6/2016 | Kaytes | B66C 13/005 248/274.1 |

FOREIGN PATENT DOCUMENTS

| | | | | |
|---|---|---|---|---|
| EP | 438266 | A * | 7/1991 | E06C 1/38 |
| FR | 2955064 | A1 | 7/2015 | |
| KR | 200482179 | Y1 | 12/2016 | |
| WO | WO-0107289 | A1 * | 2/2001 | B65D 90/146 |
| WO | 2009009904 | A1 | 1/2009 | |

OTHER PUBLICATIONS

Google Patents; machine translation of KR200482179Y1 (patent from Korea), retrieved on Sep. 13, 2023 from https://www.patents.google.com.

Wanco; "Message Signs", retrieved on Jul. 6, 2023 from https://www.wanco.com.

Sign Guru; "Mobile Signs Calgary | Portable Signs Calgary", retrieved on Jul. 6, 2023 from https://www.signguru.ca.

Wanco; "Solar Light Towers"; retrieved on Jul. 6, 2023 from https://www.wanco.com.

Sumodo; "Earth Anchor [Ground Screws and Augers] Installation Guidelines"; Copyright 2020.

Wanco; "Road Hound Distracted Driving Alert & Deterrent"; retrieved Jul. 6, 2023 from https://www.bvsystems.com.

All Traffic Solutions; "Instalert 24 Variable Message Sign", retrieved Jul. 6, 2023 from https://www.alltrafficsolutions.com.

All Traffic Solutions; "Instalert 18 Variable Message Sign", retrieved Jul. 6, 2023 from https://www.alltrafficsolutions.com.

Wanco; "X-Marker L-893(L) Certified Runway Closure Marker"; copyright 2018.

* cited by examiner

DEPLOYABLE PORTABLE SIGN SYSTEM

FIELD OF THE INVENTION

The present invention relates to portable sign systems such as but not limited to roadside informational signs.

BACKGROUND OF THE INVENTION

Portable signs are often used for temporary situations in which regional information is to be disseminated for a limited period of time. One such situation is during road construction, portable signs may be deployed adjacent to lanes of traffic prior to and throughout the construction zone. Many of these signs may or may not be digital in nature. Digital signs can convey messages, directions, warnings, and information to drivers that is dynamically changeable and updateable both locally (using a controller) and remotely (over a wireless connection). Some portable signs also provide a fixed message. Digital signs can include LED and flip-disc signs, and in some products, a scrolling banner.

Other portable signs may be intended by other types of viewers, such as foot travelers at an event such as a fair, carnival, concert, sports event, etc., and runners, such as at a marathon or triathlon.

SUMMARY OF THE INVENTION

A separable and deployable portable sign and transportation system are disclosed having at least a sign frame which is independent of and separate from a transportation frame, a sign panel on an upright member affixed to the sign frame, and one or more lift-stabilizers affixed to the sign frame, having at least a first mode of operation in a stowed position for transportation, and at least a second mode of operation in a deployed position holding the sign frame above a surface according to a minimum mating height and clearance to receive a corresponding transportation subsystem, wherein a footprint area defined by the lift-stabilizers in the second mode of operation is greater than a footprint area defined by the lift-stabilizers in the first mode of operation.

BRIEF DESCRIPTION OF DRAWINGS

The figures presented herein, when considered in light of this description, form a complete disclosure of one or more embodiments of the invention, wherein like reference numbers in the figures represent similar or same elements or steps.

DETAILED DESCRIPTION

Figure 1:
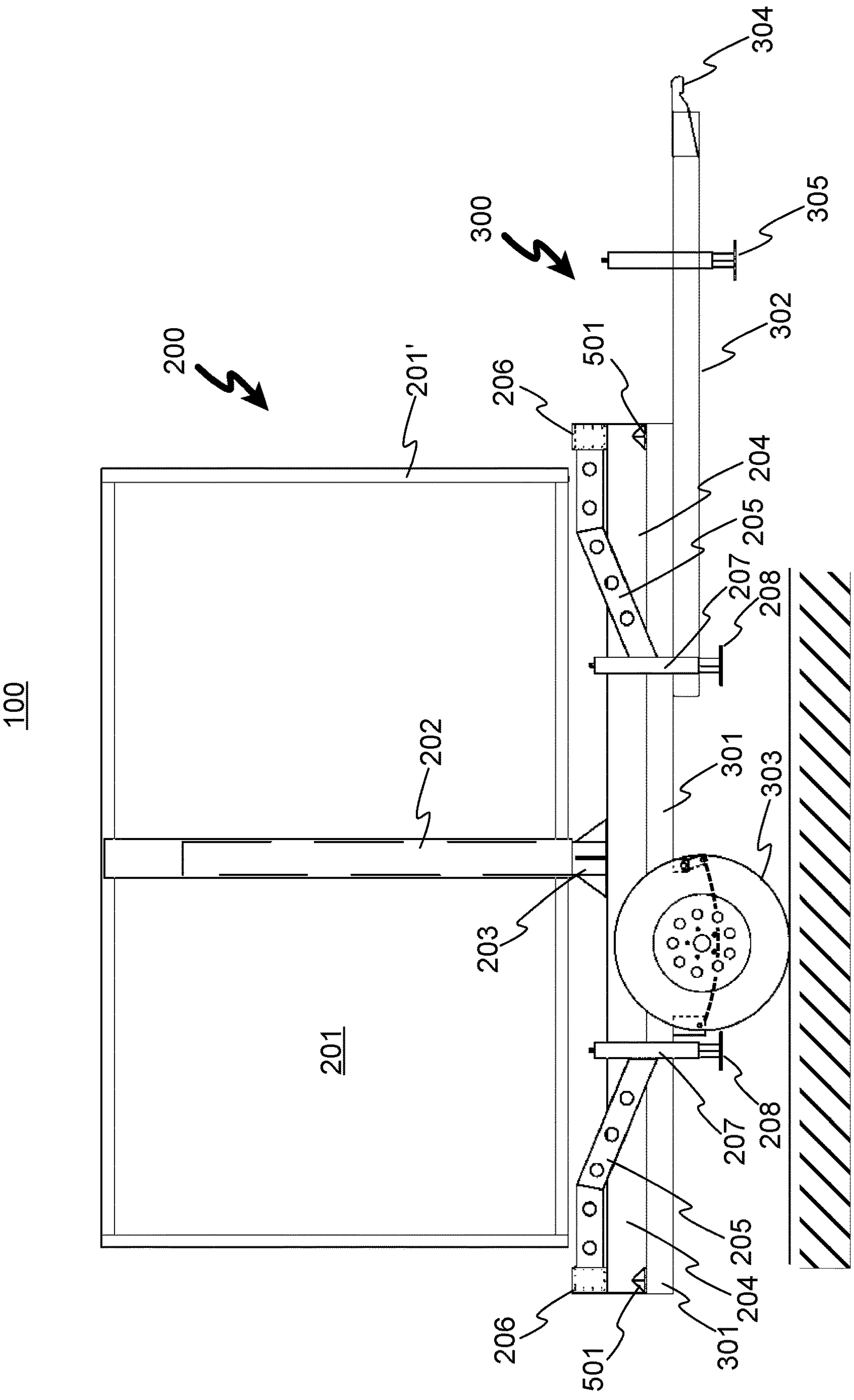
FIG. 1 depicts an embodiment according to the present invention of a deployable sign system having a trailer and a separable sign subsystem.

The present inventors have realized multiple unmet needs in the arts of portable sign systems. Portable sign systems, such as those often seen along roads during road construction are:

a. Highly vulnerable to damage from passing vehicles and construction equipment. The industry sustains an average of 1 in 6 signs destroyed by vehicle collisions per year. This damage primarily affects or destroys the trailer undercarriage (wheels, axles, lighting) in addition to the sign itself.

b. Regularly vandalized and highly susceptible to theft. Trailer lights, trailer wheels, batteries, wiring, and even trailer axles are stolen.

c. Tipped over by wind gusts. Most current sign structures attached to and dependent on trailers are only half as wide as they are long. Typical trailer construction is 7 feet wide by 14 feet long. Many of the attached signs are typically 7 feet high by 11 feet wide. The signs themselves act are large sails in high winds or strong wind gusts. At many wind angles, the signs are easily tipped over on their sides.

d. Not designed to lower operational costs. The setup and takedown for a currently designed individual sign can easily exceed two hours.

i. The stabilizers are currently located on the corners of the trailer. Most, if not all, are hand cranked, meaning it takes about 3 to 5 minutes per corner to deploy a stabilizer. The placement of these stabilizers is primarily used to level the signs and hold it up while the wheels are removed. Their location does not increase the sign footprint, meaning they minimally increase the sign stability in winds.

ii. To prevent theft, the sign owners are forced to remove the wheels and even the axles, depending on the location.

iii. In an ineffective attempt to keep the sign from tipping over, sandbags are used to weigh the sign down. The sandbags are transported in a truck, then manually placed all over the sign frame. This process takes up to 15 minutes to add the sandbags and another 15 minutes to remove the sandbags. Additionally, the typical sandbag weighs 40 pounds, introducing the strong possibility of back injuries.

The present inventors have realized that several fundamental changes to the system design can address multiple problems in the present art. This elegant solution or sort of one-solution-solves-several-problems is especially efficient and innovative, but is counterintuitive to the approach taken by existing suppliers engaged in the business of manufacturing and selling such portable sign systems. The present inventors' system design is addressing the total life cycle costs of the system design as opposed to the current existing manufacturers' approaches of only minimizing the manufacturing costs while not addressing the operational and maintenance costs for the purchasing entity.

One characteristic of currently designed portable sign systems is that they are universally and permanently provided with their own means of transportation, e.g., wheels, axles, etc. This old design means that when a unit is damaged, such as in a collision with a vehicle, not only is the sign subsystem damaged, but so is the frame, axle, etc., of the transportation subsystem. The trailer portion of the sign generally represents 25% of the total cost of the unit. The permanently integrated trailer portion of the sign means a greater repair cost, higher insurance costs, and higher maintenance costs. Further, current portable sign systems also have permanently attached towing devices (e.g., trailer hitch couplers). Theft of the units is made easy—anyone with a suitable towing hitch may cut through a simple padlock to steal the entire unit or require the owner to purchase unique and expensive locking mechanisms to prevent their theft.

The present inventors have realized and devised an invention, example embodiments of which are disclosed in the following paragraphs, which reduces the

- a. Acquisition costs (by significantly reducing the trailer costs).
- b. Repair costs.
- c. Insurance costs.
- d. Susceptibility to theft and vandalism.
- e. Significant operational costs in terms man hours sign setup and takedown.
  - i. No requirement to remove or replace wheels on site to move it.
  - ii. No requirement to remove or replace axles on site.
  - iii. No requirement to load and remove sandbags.
  - iv. Drill operated stabilizers to reduce setup time.
- f. Work related injuries.

Referring now to FIG. 1, a side view 100 of an embodiment according to the present invention. This example embodiment will be illustrated with respect to an expensive LED or light-bulb electronic portable sign, but those ordinarily skilled in the relevant arts will realize that the invention may equally be realized to other forms of portable signs including, but not limited to, static (fixed) message signs. The portable sign system has two subsystems: a deployable and separable sign subsystem 200, and a transportation platform 300. Both subsystems may be completely custom designed and built to interoperate with each other, and in other embodiments, one or both of the subsystems may be realized using existing hardware with certain adapters to achieve the invention.

The separable sign subsystem 200 has a sign or display panel 201 supported by a riser 202 and a riser base 203 to a sign base 204. The sign panel 201 may be enclosed in a panel frame 201' in some embodiments. The sign subsystem base 204 is provided with one or more lift-stabilizers 205, which of which has an earth-engaging foot 208, lift or level adjuster 207, and an attachment 206 to the sign subsystem 200 base 204.

The transportation subsystem 300 has two or more wheels 303 attached via an axle to a transportation frame 301 and may include a hitch coupler 304 and a jack stand 305 to hitch to a tow vehicle such as a truck. This particular embodiment example resembles a custom or adapted trailer, and in other embodiments, it may resemble an intermodal trailer, a custom or adapted dolly, cart, etc.

Figure 2:
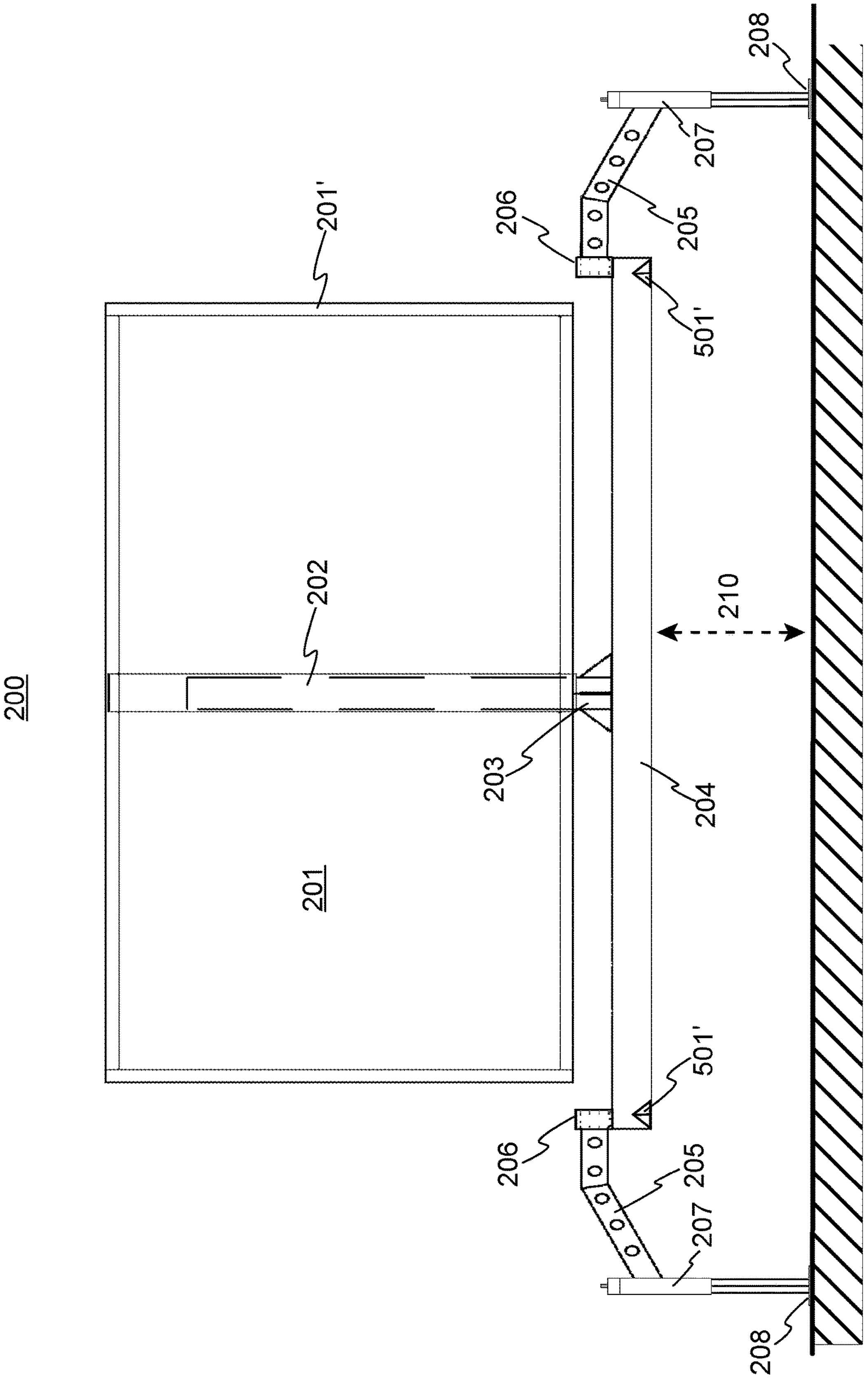
FIG. 2 illustrates an embodiment according to the present invention of a separable sign system as deployed.

Referring now to FIG. 2, an embodiment according to the present invention of a separable and deployable sign subsystem 200 is shown in a configuration separated and deployed from a transportation subsystem. This is a side view, such as that in FIG. 1, with the lift-stabilizers 205 rotated from their stowed position to their operational position, and with the feet 208 to the lift-stabilizers extended (lowered) to engage the ground and hold the sign subsystem above the transportation subsystem's height 210.

Figure 3:
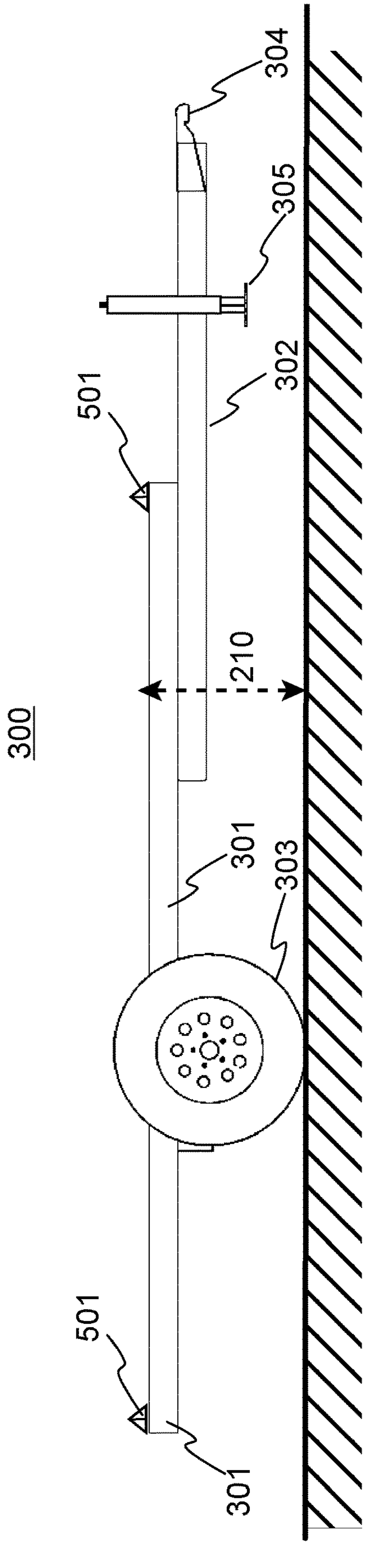
FIG. 3 illustrates an embodiment according to the present invention of a trailer for transporting, deploying, and collecting a separable sign system.

FIG. 3 shows an embodiment 300 according to the present invention of a transportation subsystem, such as that illustrated in FIG. 1, separated from a sign subsystem, ready to deploy or retrieve a sign subsystem. The mating clearance 210 allows the transportation portions of the overall system, namely the towing yoke 302, frame 301, coupler 304, axle, wheels 303, and associated vehicle lighting and registration plates to be removed from the site where the portable sign is deployed and used for a period of time. During this period of time, if the deployed and separated sign subsystem is subject to a collision, theft or vandalism, the cost of the transportation subsystem components is not involved and thereby saved. Further, by removing the primary means of transporting the sign subsystem, theft is significantly deterred.

These combined features and their benefits reduce the cost of manufacturing, purchasing, leasing, and operating a fleet of portable signs. For example, a sign fleet of 250 units now only requires 8 to 20 transportation subsystems for the 250 sign subsystems. Whereas the separable sign subsystems are expected to be less expensive individually than fully portable signs with permanently attached transportation means, this reduces fleet acquisition and operation costs significantly, including ancillary costs such as insurance.

Figure 4:
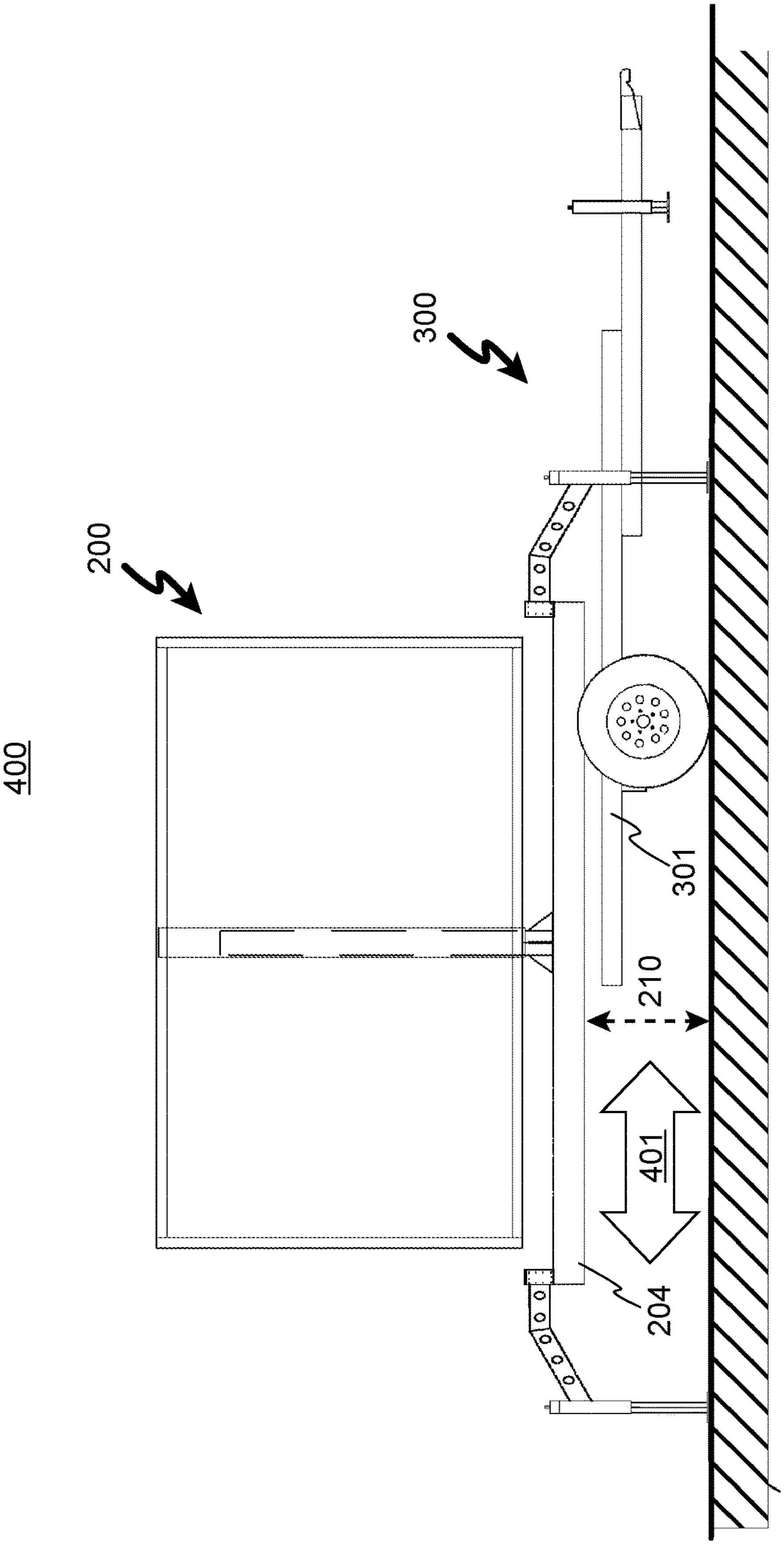
FIG. 4 sets forth an embodiment according to the present invention of deploying and retrieving (or collecting) a separable sign system.

FIG. 4 depicts 400 an embodiment according to the present invention of deploying or retrieving a separable sign system 200 using a corresponding transportation subsystem 300. In this example, one can see that the mating clearance 210 which is defined by the minimum height to rise above the transportation subsystem to allow it to be rolled under or rolled away from 401 the deployed sigh subsystem 200 to leave a sigh system by a roadside, for example, or to retrieve it from a storage yard or at the end of usage at a construction zone, for example. The extendable or rotating lift-stabilizers of the invention increase the stance or distance between their points of contact with the ground to solve multiple issues:

- a. Significantly increases the sign stability in winds by doubling the base footprint in order to prevent tip overs.
- b. Effectively widens the narrow portion of the sign to almost be as wide as the sign structure is long, again preventing damage from wind tip overs.
- c. Eliminate the need for a third-party lifting device for the sign itself by using the stabilizers themselves to raise and lower the sign onto the trailer sub assembly.
- d. Accommodate the corresponding trailer, dolly, cart, etc., to be freely rolled underneath the sign subsystem without nearing the stabilizers.

Figure 5:
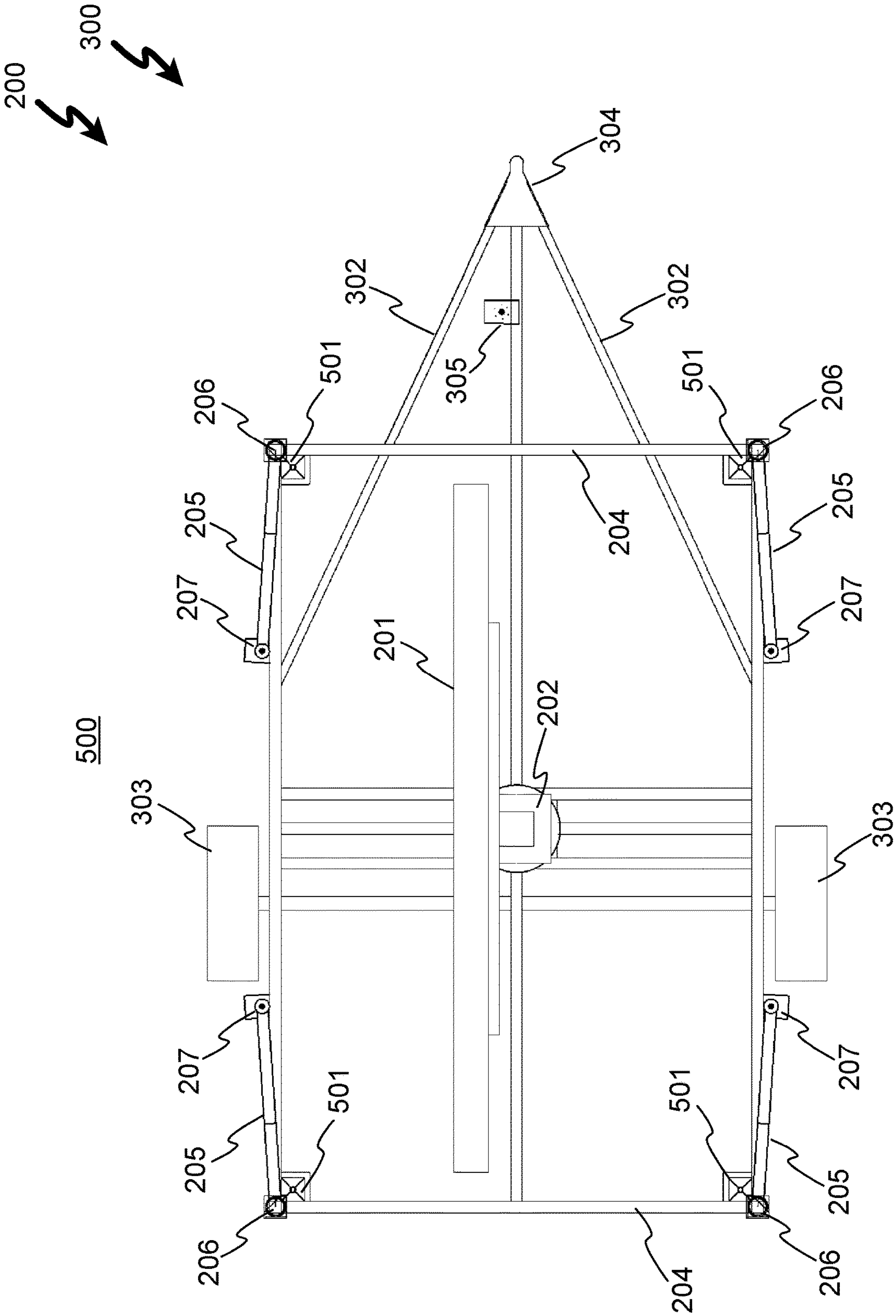
FIG. 5 shows a top-down view of the embodiment according to the present invention of FIG. 1.

FIG. 5 shows 500 a top-down view of an embodiment according to the present invention in which four lift-stabilizers 205 can be seen pivotally attached to the base 204 of a sign subsystem 200. With the lift-stabilizers stowed in a position such as this, the combined transportation subsystem carrying the sign subsystem can be conveyed and navigated through ordinary traffic lanes or moving the sign to and from its point of use.

Figure 6:
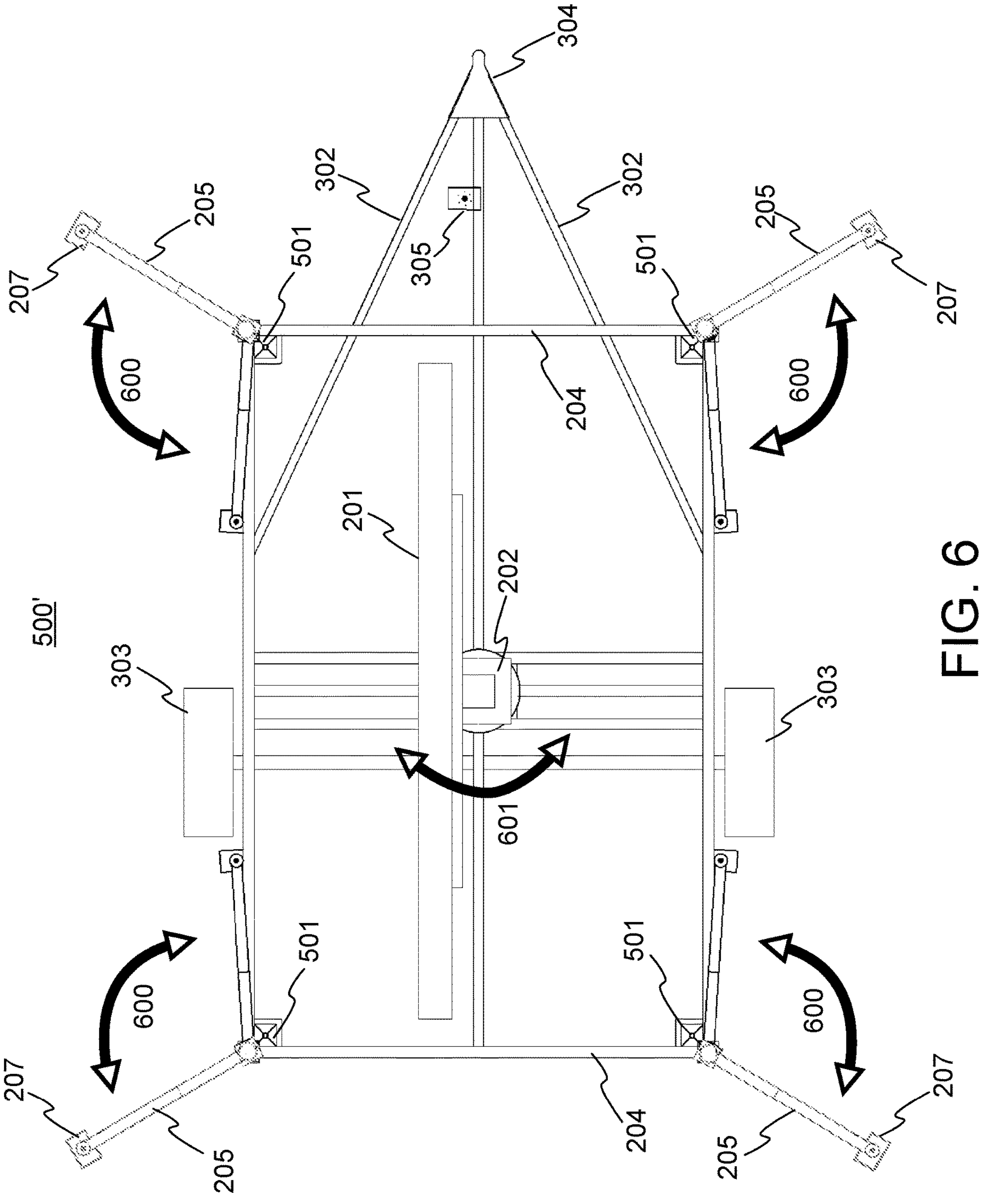
FIG. 6 illustrates operation of several components of the embodiment according to the present invention of FIG. 5.

FIG. 6 illustrates 500' the same example embodiment according to the present invention of FIG. 5 except the rotating action 600 of the lift-stabilizers and the optional rotating action 601 of the sign panel 201 are shown.

Please note that in at least one embodiment according to the present invention, one or more self-aligning devices are provided, such as pyramidal protrusions and matching recesses 501, 501', are provided onto, into, with, in addition to, integral to, or a combination thereof, to the sign subsystem and the transportation subsystem. In this manner, custom transportation subsystems and "off the shelf" transportation subsystems may be adapted to carry, transport, deploy and retrieve the corresponding sign subsystem.

Figure 8:
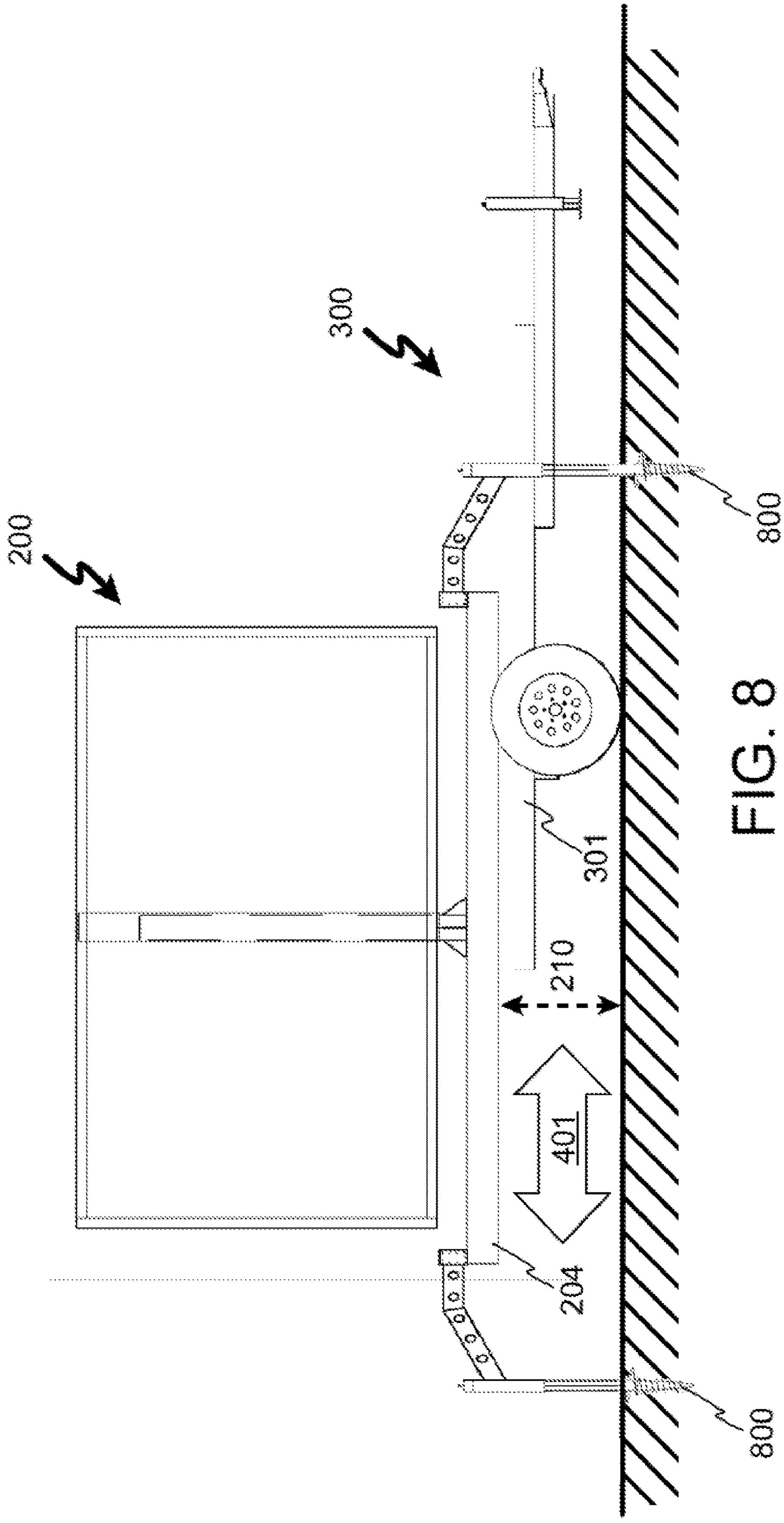
FIG. 8 illustrates 400' an embodiment according to the present invention in which earth screws or augers 800 are employed to additionally secure the embodiment to a surface.

Embodiments of the Lift-Stabilizers. Options for embodiments according to the present invention for the lift-stabilizers include feet and/or height adjusters which can be lowered and raised by hand cranks and/or by power tools such as a cordless drill. The lift-stabilizers may be provided with surface-engaging feet or platforms, and in some embodiments, they may be provided with and earth anchor (e.g., ground screw or auger 800) as shown 400' in FIG. 8, such as those manufactured and sold by Sunmodo Corporation of Vancouver, Washington, USA. The earth anchor prevents the structure from being turned by the wind and then tipped over.

Besides the horizontally-swinging lift-stabilizers illustrated in the figures, still other options for the lift-stabilizers are units which rotate upwards for stowing, and units which include telescoping elements such as hollow square metal tubes that extend. Combinations of swinging horizontally, swinging vertically and/or extending telescopically are possible in some embodiments.

In at least one embodiment, the rotating or swingable lift-stabilizers will be approximately 3 feet long. Generally, a sign trailer is 7 feet wide and 14 feet long. With the 3-foot-long lift-stabilizers pivoted to a position 135° from across the width of the transportation subsystem (IE., 135° from along the length of the trailer), 2.1 feet of "footprint" is added in both length and width of the trailer for greatly increased stability against tipping over from wind. Such a configuration effectively increases the footprint of the deployed sign to 18.2 feet long by 11.2 feet wide, which is a 30% increase in length and 60% increase in width as compared to the trailer alone.

If the same example 3-foot long lift-stabilizers are rotated to 90° from along the length of the trailer (IE., parallel to the width of the trailer), then a full 3 feet of width to the footprint is added to the footprint of the deployed sign subsystem, with no addition to the length of the sign subsystem, resulting in a footprint that is 14 feet long (no change) by 13 feet wide, an 87% increase in footprint width.

With this example embodiment, the footprint of the deployed sign subsystem is essentially doubled compared to the footprint of a suitable trailer alone, which improves stability of the sign significantly. With the example 7' by 14' transportation subsystem, having a footprint of 98 square feet, and 3' lift-stabilizers deployed at the 135° position, the deployed sign subsystem has a footprint of 11.2' by 18.2' for a total of 204 square feet, a 208% increase over the footprint of the transportation subsystem alone.

In an example embodiment of telescoping lift-stabilizers for a 7 foot wide sign structure, about 3 feet of square piping could be used for the extendable portion of the lift-stabilizer, such as square piping sliding inside of slightly larger square piping sleeve. Maintaining a foot of piping within the outer tube or sleeve for overlap and structural strength, a 90° positioned extension would add about 2 to the width of the footprint. This is also a significant improvement in stability, of course, but not as great of improvement as the longer swinging lift-stabilizer embodiment.

Figure 7:
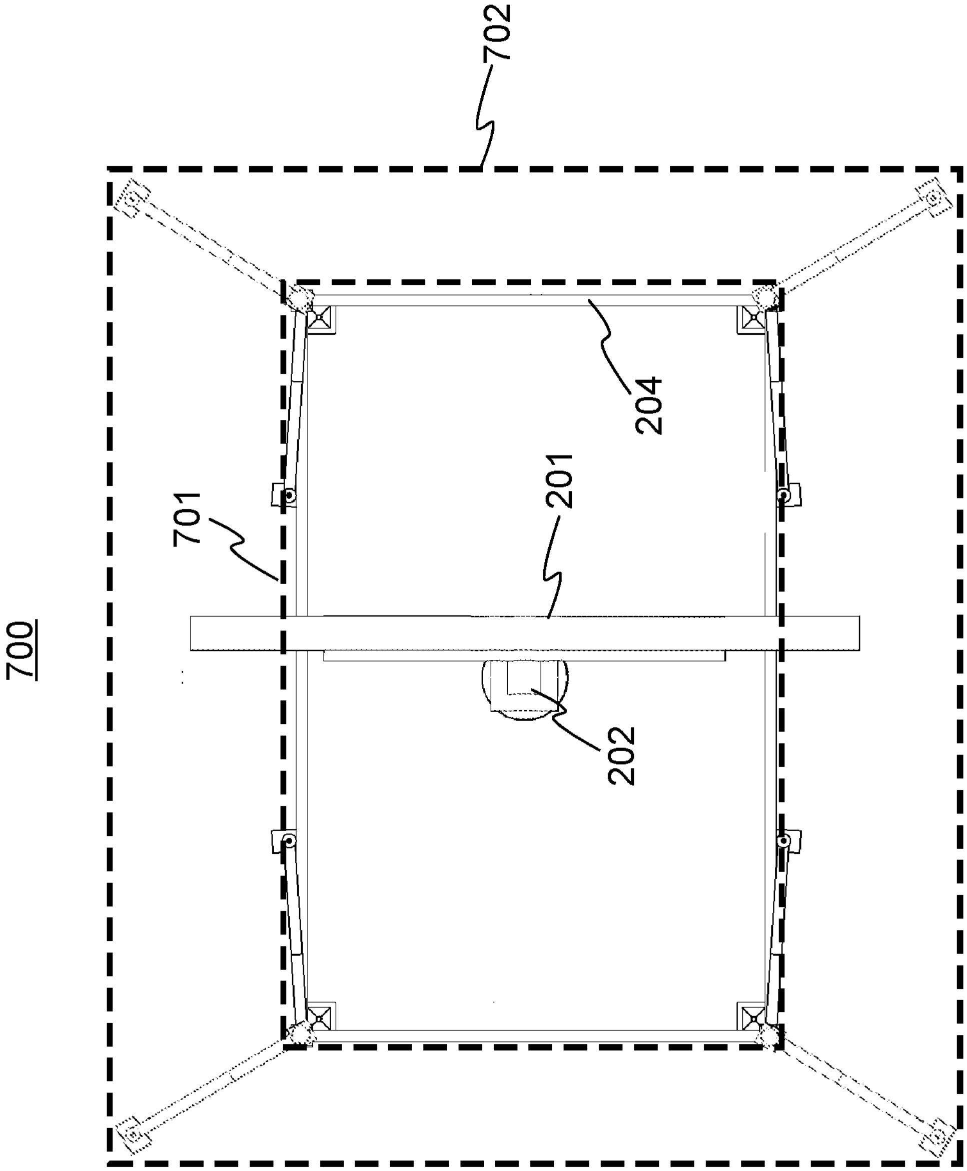
FIG. 7 shows a comparison of the footprint improvements versus the usual (unimproved) footprint of a deployed portable sign.

FIG. 7 illustrates 700 the improved footprint area 702 according to the present invention versus the normal trailer-only footprint area 701 of a currently available sign system (note the sign panel 201 is shown rotated in the normal position so that it can be viewed by oncoming traffic when the unit is parked alongside a roadway).

Sign Subsystem Embodiments. Options for embodiments according to the present invention for the sign subsystem include using a thick metal plate for the sign panel frame and/or riser that is sized to accommodate batteries, wiring harnesses, and other valuable components that are subject to theft. In this manner, the structure of the sign subsystem becomes a type of anti-theft locker or safe for the most valuable components.

Options for embodiments according to the present invention for the powering of active signs, such as LED or flip-disk signs, include solar panels, wind generators, batteries, chargers, and fossil fuel generators. Static, fixed-message signs may also benefit from active lighting to avoid reliance solely on reflectance for observability of the sign during low and no light conditions.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

Conclusion. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A separable and deployable portable sign comprising:

a sign base which is independent of and separate from a transportation frame, the sign base having an uppermost edge and an lowermost edge;

a sign panel on an upright member affixed to the sign base and extending above the uppermost edge of the sign base; and one or more stabilizers affixed to the sign base, each having a lower edge and an upper edge, having at least a first stowed configuration for transportation, and at least a deployed configuration holding the sign base above a surface according to a minimum mating height and clearance to receive a corresponding transportation subsystem, wherein a footprint area defined by the one or more stabilizers in the deployed configuration is at least eighty-percent greater than a footprint area defined by the sign base;

wherein the sign base has at least three corners in a horizontal plane, and wherein the one or more stabilizers are pivotally attached with each stabilizer lower edge above the uppermost edge of the sign base such that the one or more stabilizers may be pivoted into the deployed configuration and into the stowed configuration.

2. The separable and deployable portable sign as set forth in claim 1 further comprising a transportation subsystem having two or more wheels and a transportation frame, wherein the transportation frame is configured with a height compatible with the minimum mating height and clearance of the one or more stabilizers, or the sign base, or the one or more stabilizers and the sign base.

3. The separable and deployable portable sign as set forth in claim 1 further comprising one or more self-aligning devices configured to align the sign base with a transportation frame.

4. The separable and deployable portable sign as set forth in claim 1 wherein the one or more stabilizers are configured with one or more height adjusters.

5. The separable and deployable portable sign as set forth in claim 4 wherein the one or more height adjusters are configured to be operated hand tools.

6. The separable and deployable portable sign as set forth in claim 4 wherein the one or more height adjusters are configured to be operated a power tool.

7. The separable and deployable portable sign as set forth in claim 1 wherein the one or more lift-stabilizers are provided with one or more ground screws or augers.

8. The separable and deployable portable sign as set forth in claim 1 wherein the sign panel comprises an electronic message panel.

9. The separable and deployable portable sign as set forth in claim 1 wherein the sign panel comprises a fixed-message panel.

10. The separable and deployable portable sign as set forth in claim 1 wherein the sign base is essentially rectangular with a length of about 14 feet and a width of about 7 feet, and wherein each of the one or more stabilizers has a length of about 3 feet, and wherein the one or more stabilizers can be pivoted into the deployed configuration at an angle of about 135° from along the length of the trailer, thereby increasing a width of the footprint area by 2.1' and a length of the footprint area by 2.1' over the footprint area of the stowed configuration.

11. The separable and deployable portable sign as set forth in claim 1 wherein the sign base is essentially rectangular with a length of about 12 feet and a width of about 6 feet, and wherein each of the one or more stabilizers has a length of about 3 feet, and wherein the one or more stabilizers can be pivoted into the deployed configuration at an angle of about 135° from along the length of the trailer, thereby increasing a width of the footprint area by 2.1' and a length of the footprint area by 2.1' over the footprint area of the stowed configuration.

12. A method of use of a separable and deployable portable sign with a transportation subsystem, the method comprising:

transporting a portable sign affixed on a transportation subsystem from a first location to a second location;

at the second location, deploying one or more lift-stablizers affixed to a base of the portable sign system to stabilize and raise the portable sign to clear a height of the transportation subsystem, wherein the sign base has an uppermost edge and an lowermost edge, wherein each of the one or more lift-stabilizers has a lower edge and an upper edge, wherein a footprint area defined by the one or more lift-stabilizers in a deployed configuration is at least eighty-percent greater than a footprint area defined by the base of the portable sign, the portable sign has a sign base with at least three corners in a horizontal plane, and wherein the one or more lift-stabilizers are pivotally attached with each lower edge above the uppermost edge of the base such that the one or more lift-stabilizers may be pivoted into a deployed configuration from a stowed position; and relocating the transportation subsystem away from the second location, thereby leaving the portable sign at the second location wherein the portable sign has no means of transportation remaining affixed to it.

13. The method as set forth in claim 12 wherein the sign base is essentially rectangular with a length of about 14 feet and a width of about 7 feet, and wherein each of the one or more stabilizers has a length of about 3 feet, and wherein the one or more stabilizers can be pivoted into the deployed configuration at an angle of about 135° from along the length of the trailer, thereby increasing a width of the footprint area by 2.1' and a length of the footprint area by 2.1' over the footprint area of the stowed configuration.

14. The method as set forth in claim 12 wherein the sign base is essentially rectangular with a length of about 12 feet and a width of about 6 feet, and wherein each of the one or more stabilizers has a length of about 3 feet, and wherein the one or more stabilizers can be pivoted into the deployed configuration at an angle of about 135° from along the length of the trailer, thereby increasing a width of the footprint area by 2.1' and a length of the footprint area by 2.1' over the footprint area of the stowed configuration.

* * * * *